Feb. 10, 1970     E. G. GREENMAN     3,494,863
METHOD AND APPARATUS FOR SEPARATING OIL-CONTAMINATED
WATER WITH A POROUS RESIN IMPREGNATED FIBER BODY
Filed Jan. 9, 1969

United States Patent Office 3,494,863
Patented Feb. 10, 1970

3,494,863
METHOD AND APPARATUS FOR SEPARATING OIL-CONTAMINATED WATER WITH A POROUS RESIN IMPREGNATED FIBER BODY
Edwin G. Greenman, Neenah, Wis., assignor to Kimberly-Clark Corporation, Neenah, Wis., a corporation of Delaware
Filed Jan. 9, 1969, Ser. No. 790,047
Int. Cl. B01d 17/02
U.S. Cl. 210—41                                      7 Claims

ABSTRACT OF THE DISCLOSURE

A separator in the form of an impregnated fiber body for separating an oil-contaminant from water. The separator utilizes a strengthened fiber body and a fluorocarbon which is oleophobic but readily wetted by water. In the process of oil removal the contaminated water is directed to the fiber body suitably in the form of a paper sheet and the water passes through while the oil is retained.

---

Figure 1:
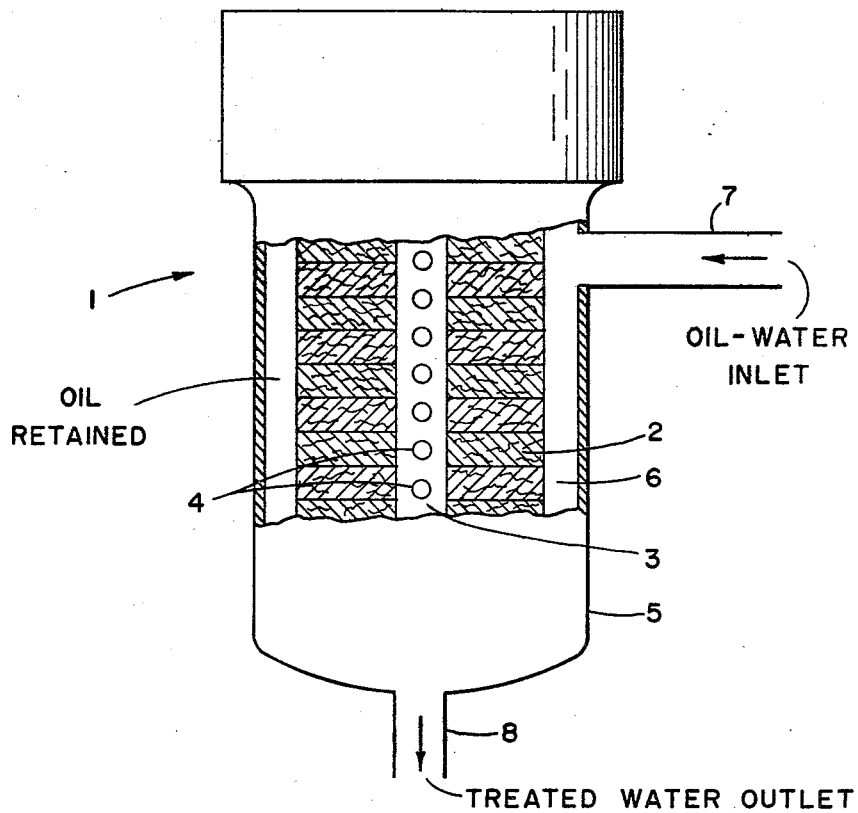

This invention relates to the treatment of water and is particularly directed to means and methods of removing oil from water by a separatory system which includes as a primary functioning element a separator paper.

BACKGROUND OF THE INVENTION

The invention with relation to the prior art

Waters, both fresh and salt, are often subjected to contamination by oils. A typical example is the ballast water and bilge water of large shipping vessels. Oil withdrawn from fuel tanks is replaced by water to maintain the ship trim; such ballast water, often in a harbor or port, is pumped from the vessel and replaced again by oil. Harbors, rivers and the like, however, become contaminated by the oil-containing bilge or ballast waters. The removal of the oil from the waters before or during pumping to prevent contamination of large bodies of water is generally a difficult and expensive procedure.

The present invention permits relatively large quantities of contaminated water to be handled relatively quickly and under a great variety of conditions as well as those present in the treatment of waters to protect rivers and ocean harbors. Separatory means involving a relatively simple impregnated paper structure is an important element of my system. Specifically, I have found that a paper may be formed which separates oil from water by refusing to pass oil materials while being readily permeable by water. The paper is of such nature that it will operate with conventional separation equipment requiring only the same type of mechanical support as is commonly employed in the filter or separator arts.

The filter paper structure in brief includes: an open porous paper of the type commonly used in the filters for automotive oils; a reinforcing resin; and a selected fluorochemical. The paper itself must be of such a nature that it will readily pass water, and the usual porous filter paper serves this purpose; the fibers may be cellulosic wood pulp, cotton, rayon or a synthetic such as nylon. The reinforcement resin is preferably an emulsifiable phenolic of conventional nature made water insoluble in the paper product by a suitable curing action and such that it does not significantly alter the porosity of the paper as to water passage; solvent soluble resins such as the polyesters or melamine and urea formaldehydes meeting the indicated requirements serve the purpose also. The fluorochemical is one which, in the combination, is hydrophilic and oleophobic to an extent that in the separator paper product it inhibits the passage of oil and permits the passage of water but does not load quickly with oil particles. Also, the selected fluorochemical for ease of separator paper manufacture is preferably water soluble so that it may be readily applied to the paper, suitably at the same time as the reinforcing resin; however, fluorochemicals which require the presence of an organic solvent to attain significant quantities of the fluorochemical in solution are useful for my purpose.

Fluorochemicals are known which are repellent to both oil and water. Also, it is known to make fibrous materials both oil and water repellent by the inclusion of fluorochemicals in treating agents for the fibers. I have found, however, that porous type filter paper, suitably reinforced by resin addition to strengthen the paper for the handling of liquids, may be rendered oil repellent by fluorochemical inclusion while yet being sufficiently hydrophilic to permit water to pass the paper. Thus, water contaminated with oil may be freed of the oil contaminant.

The oil repellency of the separator paper is apparently due to the presence of the fluorinated carbon chain and its molecular orientation to the paper surface; such fluorochemicals, when carried on the cellulose pulp surface, however, appear to retain a hydrophilic character and to permit water passage if the fluorochemical has in conjunction with a fluorinated chain of at least six carbon atoms a water soluble "tail." Other factors than the specific structure of the fluorinated chain are also apparently pertinent to the retention of the capacity of the treated paper to provide the desired hydrophilic characteristic. For example, excessive curing temperatures should be avoided as should excessive concentrations of the fluorochemical itself. Additionally, the presence in the paper of other agents may, of course, influence the hydrophilic versus the hydrophobic properties demonstrated by the impregnated sheet. For example, in general wax-like components should be avoided and, in contrast, surfactants intended to increase water wettability may increase the tendency to greater water flow through the paper.

I have found that the fluorochemicals useful for my purpose are those which, when tested according to Tappi Method (size test) T–433M44 entitled "Water Resistance of Paper and Paperboard Dry Indicator Method" exhibit a value of 0 to about 5 seconds. In essence, such papers may be said to wet instantaneously.

Soluble salts of the perfluoroaliphatic acids having between about 4 to 10 carbon atoms in the perfluoro portion of the molecule are considered of utility in my separator papers as are mixtures of such salts, and the acids as well as mixtures of the acids. Particularly, water soluble salts and specifically the potassium salts appear quite useful though ammonium salts and apparently sodium salts also are available for the purpose. Useful fluorochemicals include perfluoro alkyl sulfonate; perfluorated quaternary ammonium compounds; potassium perfluoro caprylate and the like. In specific aspect, the optimum paper for a particular application may be readily determined by simple experiment in accordance with the principles of this invention. Basically, I prefer to limit curing temperatures and times for the material to 350° F. and less than 15 minutes, and to limit the concentration of the fluorochemical to 5% or less on the total weight of the product and preferably to between about 0.5% and 1.5%.

I have found that the degree of water solubility of some useful fluorochemicals is such that they may be applied from an aqueous solution or as an emulsion together with the strengthening resin. Further, such compounds, when cured, are not readily leached from the paper in use and a relatively long life is attainable for the separator paper. In fact, separator paper in accordance with this invention has been operated continuously to effect oil-water separation over a period of days with no significant deterioration in the quality of the separation. Fuel oils, motor oils such as S.A.E. No. 30 and castor oil have been removed readily from water in the practice of the invention.

Figure 2:
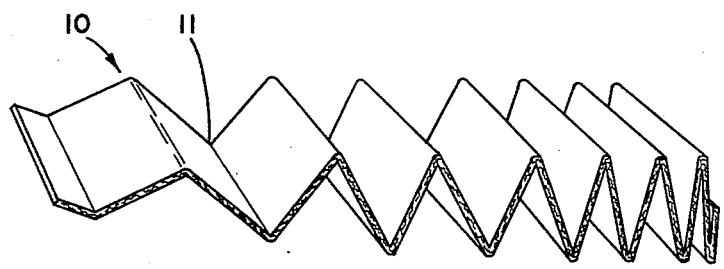

The invention will be more fully understood by reference to the following detailed description and accompanying drawings wherein:

FIG. 1 is a view of a generally conventional cartridge for filtration of oil as in automotive applications but incorporating the oil-water separation paper of this invention; and FIG. 2 is a view of the oil-water separation paper folded so as to form pleats.

Referring to the drawings, the numeral 1 in FIG. 1 designates generally a cartridge of the type used to filter the oil for automotive vehicles. The cartridge includes the separation paper 2 formed as planar annular sheets and disposed in superposed relation about a hollow filter tube 3 having perforations 4. The sheets are spaced from the container 5 by an annular space 6, the sheets being retained within the container in fixed position in any convenient manner known to the art. The container 5 of the cartridge includes an inlet 7 for the flow of liquid to annular space 6.

An outlet 8 communicates with the interior of hollow filter tube 3 and provides for passage of clarified fluid from the cartridge. In operation in separating oil from water, the oil-water mixture is fed through inlet 7 to space 6; the separator paper bordering space 6 is receptive to the passage of water to the interior of tube 3 through the paper and perforations 4 but the paper repels the passage of oil. Consequently, oil of an oil-water mix entering inlet 7 is concentrated in annular space 6 and on the separator paper.

The separator paper in one preferred embodiment is prepared with a 36 pound per ream (1300 sq. ft.) unbleached kraft paper of a thickness of about 22 mils. This paper is prepared from a pulp having a Canadian Standard Freeness of about 650 cc. The unsized sheet of a porosity of about 12 c.f.m. at ½″ water pressure drop is saturated with an aqueous emulsion containing about 420 parts of water, about 100 parts by weight of water emulsified phenol formaldehyde resin and about 5 parts by weight of the potassium salt of a perfluorocarbon identified as potassium perfluoro caprylate. The sheet saturant pickup per 100 parts of fiber is approximately 50 parts by weight (dry basis) of the phenol formaldehyde and 2.5 parts of the perfluorocarbon. The sheet is then cured at a temperature of about 300–325° F. for 10 minutes.

The phenolic resin serves the function of imparting strength to the paper sheet and stabilizing it against fiber swelling without significantly affecting sheet porosity; the perfluorocarbon, while known to be oleophobic, I have found, is sufficiently hydrophilic in conjunction with wood pulp and the strengthening resin as to permit wetting by water and passage of water through the sheet. A sheet similarly made but without the perfluorocarbon readily allows both oil and water to pass.

Water containing by weight about 1% of No. 6 fuel oil has been clarified of substantially all the oil in one pass of the separator paper described herein.

I have further found that, if the oil-water mixture to be separated is slightly acid or is made acid to a pH of about 6.5 or below by addition of an hydrochloric acid solution, then the fluorochemical is better retained in the sheet increasing separator paper life.

In some instances, as indicated in FIG. 2 of the drawings, the sheet may be formed into other than the planar or disc configuration of FIG. 1. Thus, the sheet 10 may be provided with folds 11 so that a pleated separator or filter is provided as is common in many automotive oil filters, for example. The formation of the sheet to a particular configuration suitably takes place after strengthening resin and fluorochemical impregnation but before curing of the resin; curing may cause some sheet embrittlement depending particularly on the sheet loading and sheet rupture result if forming to complex configurations follows resin cure. Also, over curing may tend to decrease the permeability to water to some degree.

The salt of the perfluoro aliphatic acid chosen for use, and having about 4 to 10 carbon atoms, may usually be employed effectively in the range of about 0.1% to 1.0% by weight based on the dry weight of the paper, the amount required depending upon the specific nature of the paper and the separator agent chosen.

Commercially useful agents capable of exhibiting the oleophobic characteristic and a suitable hydrophilic quality when combined with the resin treated paper include those available from the 3M Company under the designations FC95, FC134, FC807 and FC128, for example. The extent of water solubility of some useful fluorochemicals may be such in view of the quantity of impregnant desired in the paper that resort to organic solvents for a solution or a dispersion of a good concentration is preferred. In many instances where low concentrations only are available, more than one dip coat, spray coat or the like with drying between coats may be practiced; pickups of total impregnant by weight based on 100 parts of fiber may suitably be in the range of 30 to 150 depending on the specific components. In most cases it is desirable to limit the pickup by the paper to the quantity of fluorochemical required for the purpose. This is for the reasons that excess material is generally useless and expensive, more difficult to attain in a single treatment of the paper and, in most instances, the hydrophilic quality of the product tends to be suppressed with increasing amounts of the fluorochemical, particularly beyond about 2% by weight on the product. Some variation in the capacity of the paper impregnated with various fluorochemicals and various strengthening resins may be expected. Additional factors influencing the properties of the separator papers are the fibers which form the porous bodies as well as the time and temperature of cure; the fibers should be resistant to oils to which the fiber body will be subjected and the strengthening resins may be applied from solvent as well as aqueous dispersions; such factors, however, are physical, well understood in the art, and readily selected for a particular operation.

A very quick test useful in selecting a paper for separation of a particular oil from a water sample is to simply place drops of the oil and water on a sheet of the impregnated paper. A useful sheet will be wetted by the water which is absorbed and spread out while the oil remains as a bead. Additionally, if the water tends to bead on the sheet as well as the oil and to separate from the oil, then the sheet is usually too hydrophobic for use in the separation system.

What is claimed is:

1. A separator for separating an oil containment from water, said separator comprising a substantially oil and water insoluble porous fiber body, a cured water insoluble strengthening resin impregnant extending throughout said body in film form coating fibers of the body without substantially altering the porous character of the fiber body, and a perfluorocarbon also impregnating and carried by fibers of the porous body, said impregnated fiber body being repellent to oil and sufficiently hydrophilic to be instantaneously wetted by water.

2. A separator according to claim 1 in which the perfluorocarbon is incorporated in the resin film on the fibers.

3. A separator according to claim 1 in which the fibers are wood pulp fibers.

4. A separator according to claim 1 in which the resin is a phenol formaldehyde resin and the perfluorocarbon is present to the extent of between about 0.5 and 5% on the weight of the impregnated separator.

5. The process of removing an oil contaminant from water which comprises directing the water containing the oil to a paper separator having therein a strengthening resin and a perfluorocarbon, and removing water through the paper while retaining oil on the side of the paper to which the contaminated water was directed.

6. A process according to claim 5 in which the contaminated water directed to the paper separator is slightly acidic.

7. The process according to claim 5 in which the paper separator, when subjected to the Tappi size test as defined hereinbefore, exhibits a value of between 0 and 5 seconds so that the water wets the paper substantially instantaneously.

References Cited
UNITED STATES PATENTS

| | | | |
|---|---|---|---|
| 2,960,234 | 11/1960 | Fredrickson | 210—457 |
| 3,044,957 | 7/1962 | Dow et al. | 210—508 |
| 3,312,351 | 4/1967 | Kasten | 210—307 |
| 3,250,398 | 5/1966 | Adiletta | 210—507 |

JAMES L. DECESARE, Primary Examiner

U.S. Cl. X.R.

210—488, 493, 508